No. 631,770. Patented Aug. 29, 1899.
L. BAILEY.
SCREW CUTTING MACHINE.
(Application filed Mar. 22, 1899.)

(No Model.) 2 Sheets—Sheet 1.

Witnesses:
E. L. Buckland
C. E. Buckland

Inventor:
Leonard Bailey
By Millard Eddy
Atty.

No. 631,770. Patented Aug. 29, 1899.
L. BAILEY.
SCREW CUTTING MACHINE.
(Application filed Mar. 22, 1899.)
(No Model.) 2 Sheets—Sheet 2.

Witnesses:
E. L. Buckland
C. E. Buckland

Inventor:
Leonard Bailey,
By Willard Eddy,
Atty.

UNITED STATES PATENT OFFICE.

LEONARD BAILEY, OF WETHERSFIELD, CONNECTICUT.

SCREW-CUTTING MACHINE.

SPECIFICATION forming part of Letters Patent No. 631,770, dated August 29, 1899.

Application filed March 22, 1899. Serial No. 710,083. (No model.)

*To all whom it may concern:*

Be it known that I, LEONARD BAILEY, of Wethersfield, Hartford county, Connecticut, have invented certain new and useful Improvements in Screw-Cutting Machines, which improvements are described in the following specification and are illustrated by the accompanying drawings.

This invention relates to that class of screw-cutting machines in which the work is rotarily fed to a milling-cutter which revolves in an unchanging position.

It is the object of the invention to render a machine of this class capable of being adjusted to cut either right-hand screws or left-hand screws, as may be desired, and hence capable of cutting threads of opposite direction upon the opposite terminal portions, respectively, of a single rod or screw-blank for the purpose of producing a right-hand and left-hand screw. To accomplish this object, I use a pivoted support for the work and in alternation oppositely-threaded feed-screws, substitutes for each other, whereby according to the direction of the thread which is to be cut the work is presented to the cutter at different angles and is fed either forward or backward, as may be required.

The accompanying drawings exhibit not only the best manner in which I have contemplated applying the principles of my invention, but also the proportionate dimensions of the different parts of the mechanism which I have found it convenient to employ.

Figure 1:
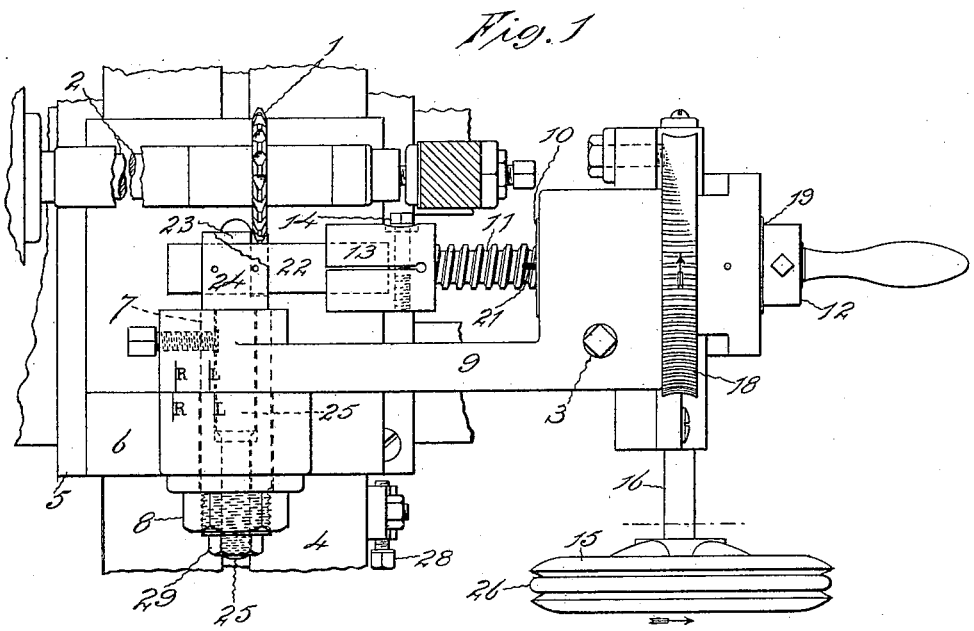
Figure 4:
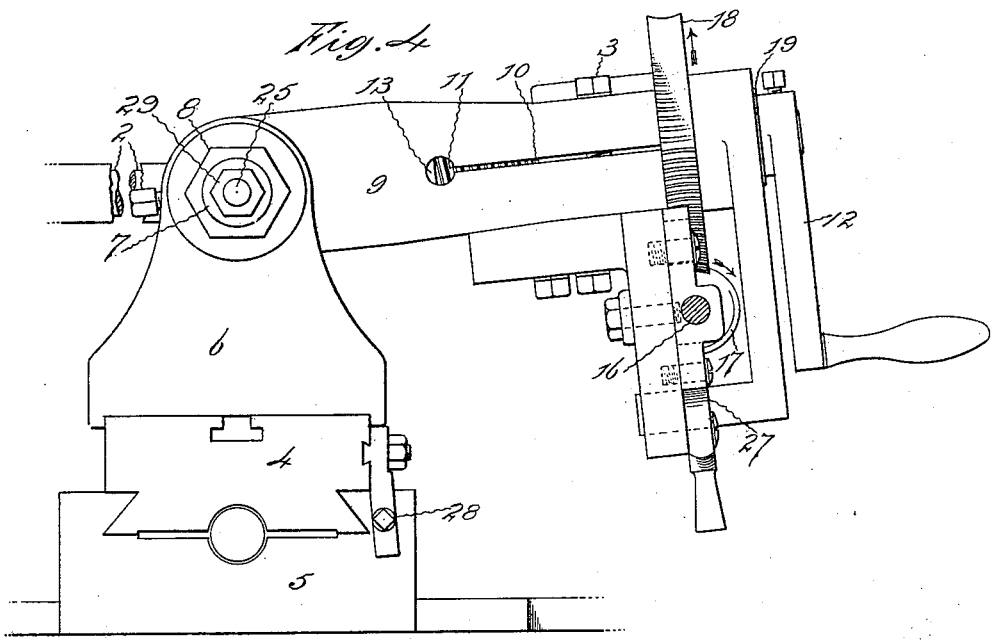
Figure 2:
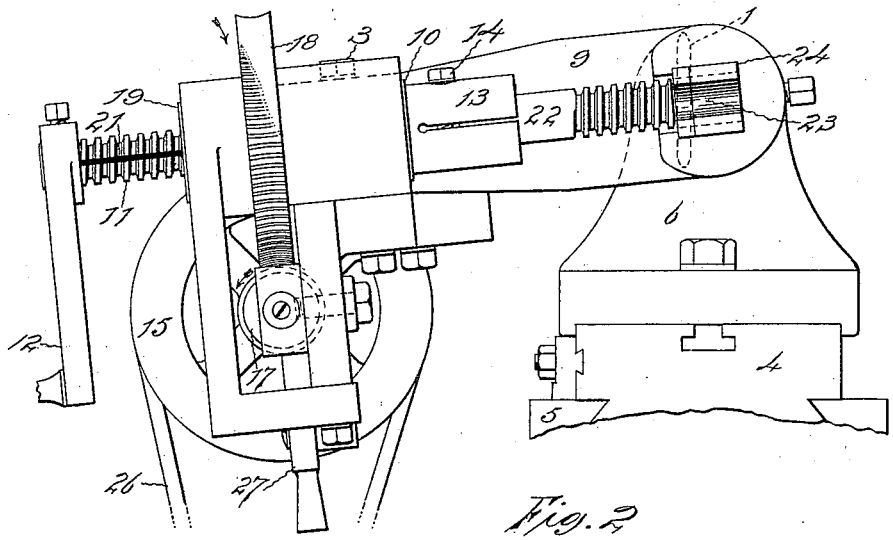
Figure 3:
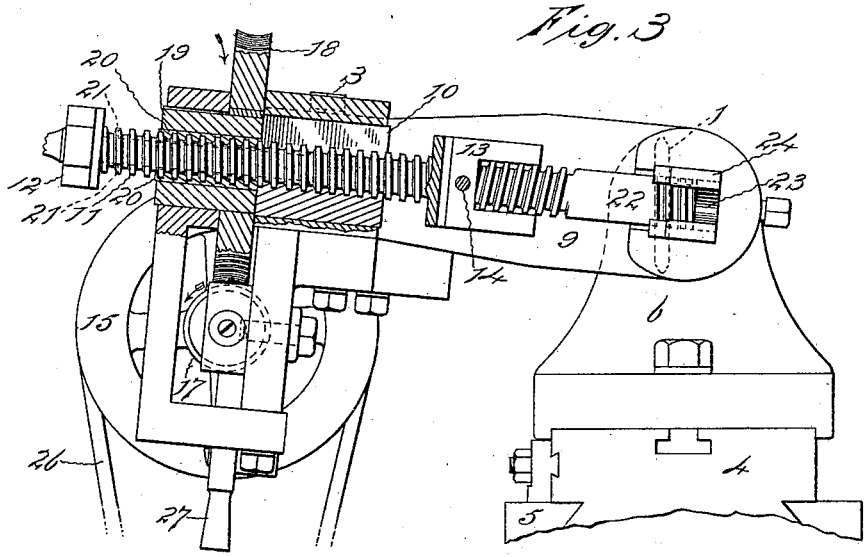

Figure 1 is a plan of a screw-cutting machine that is constructed in accordance with the requirements of my invention. In this view the machine is supplied with a left-hand feed-screw, and in this respect is adjusted for cutting a left-hand screw-thread. In the same view the pivoted portion of the machine is set in a horizontal position, and in this respect is not adjusted for cutting a thread of either direction. Fig. 2 is a rear elevation of the same machine, but without the cutter and without the cutter-driving mechanism. In this view the machine is adjusted for cutting a left-hand thread, which is shown cut. Fig. 3 is a rear elevation of the mechanism of Fig. 2, partly in section. In this view the machine is by substitution supplied with a right-hand feed-screw, is otherwise adjusted for cutting a right-hand thread, and is shown in the act of cutting such thread. Fig. 4 is a front elevation of the same machine provided with a right-hand feed-screw and adjusted as at the close of the operation of cutting a right-hand thread.

In a general aspect the machine that is depicted in the views consists of two principal parts—first, a stationary milling-cutter, together with mechanism for holding and rotating the same, and, second, adjustable mechanism by which the work is presented and rotarily fed to such stationary and revolving cutter. The first of these elements, separately considered, involves nothing new. The second is the basis of the claims below. Such first part of the machine includes the cutter, which is designated by the numeral 1, and the cutter-spindle 2, as shown in Fig. 1, which are rotated in a fixed position and in the usual manner by appropriate driving mechanism, which is not shown in the drawings. For the support of the mechanism constituting such second part of the machine a carriage 4, adjustable upon bed 5 in the usual manner, is provided with a massive iron standard 6, bolted to said carriage. By means of a hollow pivotal bolt 7 and clamping-nut 8 a strong lateral arm 9 is pivoted to this standard and firmly set in different positions of adjustment, as shown in the drawings. In a split and hollow portion of arm 9 beyond the elbow is firmly seated and clamped in its seat by screw 3 a split female screw-sleeve 10, which accommodates the feed-screw 11 and holds it in position, as shown in Fig. 3. This feed-screw is armed at the outer end with a hand-crank 12 for quick adjustment and at the inner end with a work-holder 13, consisting of a split thimble, which is designated by the same numeral, and is provided with a clamping-screw 14. The power of pulley 15, being transmitted through shaft 16, worm 17, and gear-wheel 18 to a rotary collar 19, is communicated to the feed-screw 11 by a spline 20, which is set fast in the collar and slides in groove 21 in the screw. The stock 22, having one end clamped in holder 13 by means of screw 14 and having the other end guided by and in the cylindrically-concave opening 23 of the work-rest 24, is held steadily in line with feed-screw 11 and is presented to cutter 1 without further centering. That work-rest has a shank 25, which is seated firmly and concentrically in the hollow pivotal bolt 7 and is held in place by the terminal nut 29. (Shown in Figs. 1 and 4.) As holder 13 and rest 24 are in each instance adapted to the size of the stock which they are to accommodate, each machine is provided with as many such holders and rests for successive use as the different sizes of screws to be cut may successively require, and as the pitch and direction of the feed-screw 11 are in each instance exactly reproduced in the work each machine is also provided alternately with feed-screws which are respectively identical in pitch and direction with the several screws which are to be cut by that machine, and each such feed-screw is provided with its appropriate screw-sleeve 10 to be inserted in arm 9 in the position shown, as occasion may require.

In adjusting the machine for any prescribed work select a feed-screw 11 having the pitch and direction of the screw that is to be cut and having its terminal holder 13 of proper size to hold the given screw-blank. Insert such feed-screw and its appropriate screw-sleeve 10 in arm 9 in the position shown in the drawings. Insert the specified blank 22 in that holder. Select a work-rest 24 whose opening 23 is of proper size to admit and steady the work proposed. Fasten that rest in the position shown by inserting its shank 25 in the hollow pivotal bolt 7, as described. Then, according as a right-hand thread or a left-hand thread is to be cut upon the blank, raise or lower the pivoted arm 9 from its horizontal position shown in Fig. 1 to an inclined position, (shown in the remaining figures,) as may be necessary for the presentation of the blank to the cutter at the proper angle for cutting a thread of the desired pitch. Clamp arm 9 in such inclined position by turning up nut 8. One of the index-lines, which are marked on the top of arm 9 with the letters R and L, as shown in Fig. 1, will then register with the correspondingly-marked line on the top of standard 6. For the purpose of operating the machine to cut a right-hand screw on one part of the blank and a left-hand screw on another part of the blank two such adjustments are necessary, one after the other, as shown in the drawings, as above described. To accommodate these adjustments, the belt 26 may be lengthened and shortened, as required. To permit the longitudinal adjustment of the feed-screw by crank 12, the mutual engagement of worm 17 and gear-wheel 18 is interrupted and restored, as occasion may require, by manipulation of cam 27, which for that purpose lowers and raises in a familiar manner the adjustable bearings of shaft 16. When it is desired to commence the cutting of any thread, the described adjustments having been made, the carriage 4 is run forward until the cutter 1 is brought into contact with blank 22 at the point where the cutting is to begin. The cutting of a right-hand thread will begin at the advanced end of the stock, feeding forward, while the cutting of a left-hand thread will begin at that end of the thread which is nearest the holder 13, feeding backward. As the cutter 1 enters the stock 22 the carriage 4 is advanced in the usual manner as much as the prescribed depth of the cut and until stopped at the predetermined point by contact of stop-screw 28 with bed 5. Both in feeding forward and in feeding backward, as described, the work rotates uniformly in a single direction. (Indicated by arrows in the four figures.)

Such being the construction and operation of the machine, I claim—

1. In a screw-cutting machine, a carriage for translating the work in a radial direction toward and from the cutter, in combination with a work-supporting arm, which is adjustably mounted on said carriage about a pivotal axis parallel to said direction of translation, substantially as and for the purpose specified.

2. A rotary cutter, mechanism for holding and rotating the same in an unchanging position, and a carriage, which is adapted to translate the work into engagement with the cutter, in combination with a work-supporting arm, which is adjustably pivoted to said carriage on an axis parallel to its direction of translation, substantially as and for the purpose specified.

3. In a screw-cutting machine, a cutter, rotating in a fixed position, a carriage, and an adjustable arm, which is pivoted to said carriage, in combination with a feed-screw, which is journaled in said pivoted arm, and has its axis constantly in a plane parallel to the axis of the cutter, substantially as and for the purpose specified.

4. A stationary cutter, and mechanism for holding and rotating the same, a carriage, and an arm, which is mounted on said carriage by means of a pivot, in combination with a feed-screw, which is journaled in said pivoted arm, is axially in line with the work, and is adjustable at any desired angle with the cutter by a corresponding pivotal adjustment of said arm, substantially as and for the purpose specified.

5. In a screw-cutting machine, a milling-cutter, and mechanism for holding and rotating such cutter in a fixed position, in combination with a carriage, an adjustable arm, which is pivoted to said carriage, and a pattern feed-screw, which is provided with a terminal work-holder, is journaled in said pivoted arm, and lies axially in a plane parallel to the axis of the cutter, substantially as and for the purpose specified.

6. A cutter, which is rotatable in a fixed position, a sliding carriage, an arm, which is mounted on said carriage, and a pattern feed-screw, which is provided with a terminal work-holder, and is journaled in said arm, in combination with a pivotal connection between said arm and carriage, whereby the work may be pivotally-adjusted to feed in paths of different inclination to the cutter, according to the pitch and direction of the thread which is to be cut, substantially as and for the purpose specified.

7. In a screw-cutting machine, a rotary cutter, and mechanism for driving such cutter in an unchanging position, in combination with a carriage, having an adjustable arm, a feed-screw which is journaled in said arm, and is axially in line with the work, mechanism for rotating the work and feed-screw, and a pivotal connection between said arm and carriage, whereby the work may be adjusted to feed in a path of any desired inclination to the cutter, according to the pitch and direction of the screw-thread which is to be cut, substantially as and for the purpose specified.

8. A rotary cutter, mechanism for holding and driving the same in an unchanging position, a carriage, an adjustable arm and a work-rest, which are pivoted to said carriage, in combination with a work-holder and a pattern feed-screw, which are seated in said pivoted arm, and whose axes, being in line with each other, in a plane parallel to the axis of the cutter, are adjustable to any desired direction in that plane by the pivotal movement of said arm, substantially as and for the purpose specified.

9. In a screw-cutting machine, a cutter, mechanism for holding and rotating the cutter in an unchanging position, a pattern feed-screw, which is provided with a terminal work-holder, and is interchangeable with a substitute feed-screw of different pattern, and mechanism for operating the feed-screw, in combination with a carriage for translating the holder into and out of cutting relation with the cutter, and a pivotal connection between such work-holder and such carriage, whereby the work may be pivotally preadjusted to engage the cutter at any desired angle when the carriage is advanced, substantially as and for the purpose specified.

10. In a screw-cutting machine, a milling-cutter and mechanism for holding and rotating the same in an unchanging position, a carriage for translating the work to and from the cutter, a work-supporting arm, which is adjustably pivoted to said carriage, and a feed-screw, which is provided with a terminal work-holder, and is seated in such pivotally-adjustable arm, in combination with means for changing said feed-screw for another, having a thread of different pitch or direction, or both, according to the work to be done, and mechanism, which is carried by said arm, and is adapted to drive the feed-screw, substantially as and for the purpose specified.

11. In a screw-cutting machine, a carriage for translating the work in a radial direction toward and from the cutter, and a work-supporting arm, which is adjustably mounted on said carriage about a pivotal axis parallel to said direction of translation, in combination with a pattern feed-screw, which is provided with a terminal work-holder, is seated in such pivoted arm, and is adapted to be exchanged for a substitute feed-screw of a different pattern, substantially as and for the purpose specified.

12. In a screw-cutting machine, a milling-cutter and mechanism for holding and rotating the same in a fixed position, a carriage that is movable toward and from the cutter in a direction parallel to a radius of such cutter, and an adjustable arm, which is pivoted to said carriage on an axis parallel to the direction of translation of such carriage, in combination with mechanism, seated in said pivoted arm, and adapted to hold and operate a feed-screw, which is armed with a terminal work-holder, and is of any desired or selected pattern, substantially as and for the purpose specified.

In testimony whereof I hereunto set my name in the presence of two witnesses.

LEONARD BAILEY.

Witnesses:
WILLARD EDDY,
EDWARD M. YEOMANS.